United States Patent
Shindo et al.

(10) Patent No.: US 8,355,165 B2
(45) Date of Patent: Jan. 15, 2013

(54) IMAGE PROCESSING APPARATUS AND CONTROL METHOD FOR RESTORING COLOR IMAGE DATA

(75) Inventors: Yukihiro Shindo, Inagi (JP); Yukichika Ichihashi, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 1142 days.

(21) Appl. No.: 11/874,726

(22) Filed: Oct. 18, 2007

(65) Prior Publication Data

US 2008/0130059 A1 Jun. 5, 2008

(30) Foreign Application Priority Data

Dec. 5, 2006 (JP) .................. 2006-328205
Apr. 24, 2007 (JP) .................. 2007-114330

(51) Int. Cl.
*G06F 15/00* (2006.01)
*G06K 9/00* (2006.01)
*G06K 7/10* (2006.01)

(52) U.S. Cl. ........ 358/1.9; 358/3.27; 358/3.28; 358/539; 328/100; 328/162; 328/167; 328/254; 235/462.01

(58) Field of Classification Search ............ 358/3.28, 358/1.9, 296, 539; 382/100, 162, 166, 167, 382/254, 274, 275; 235/494, 462.01, 462.16, 235/462.24, 462.25; 713/176

See application file for complete search history.

(56) References Cited

U.S. PATENT DOCUMENTS

| | | | | |
|---|---|---|---|---|
| 5,253,078 A * | 10/1993 | Balkanski et al. | ............ | 382/250 |
| 5,642,208 A * | 6/1997 | Takahashi et al. | ............ | 358/501 |
| 5,818,966 A | 10/1998 | Prasad et al. | | |
| 6,738,510 B2 * | 5/2004 | Tsuruoka et al. | ............ | 382/167 |
| 6,956,958 B2 * | 10/2005 | Fan et al. | ............ | 382/100 |
| 7,174,030 B2 * | 2/2007 | Sugahara et al. | ............ | 382/100 |
| 7,391,901 B2 * | 6/2008 | de Queiroz et al. | ............ | 382/166 |
| 2004/0263887 A1 * | 12/2004 | Kotani | ............ | 358/1.9 |
| 2006/0103861 A1 * | 5/2006 | Klassen et al. | ............ | 358/1.9 |
| 2006/0187475 A1 * | 8/2006 | Fujioka | ............ | 358/1.9 |

FOREIGN PATENT DOCUMENTS

| | | |
|---|---|---|
| JP | 01-197878 A | 8/1989 |
| JP | 05-048909 A | 2/1993 |
| JP | 08-279896 A | 10/1996 |
| JP | 10-126607 A | 5/1998 |

* cited by examiner

*Primary Examiner* — Steven Kau
(74) *Attorney, Agent, or Firm* — Canon USA, Inc., IP Division

(57) ABSTRACT

An apparatus is capable of processing luminance data and color-difference data of color image data. The apparatus includes a generation unit configured to generate digital watermark image data based on the color-difference data of the color image data, and an output unit configured to output the luminance data and the digital watermark image data generated by the generation unit. Color image data can be generated based on the digital watermark image data and the luminance data output from the output unit.

6 Claims, 15 Drawing Sheets

LUMINANCE DATA HISTOGRAM

AREA-DIVIDED IMAGE (AREA 5) REPRESENTATIVE VALUE AVG = 84

DIVISIONAL LUMINANCE DATA (IN AREA 5)

IMAGE PROCESSING APPARATUS AND CONTROL METHOD FOR RESTORING COLOR IMAGE DATA

BACKGROUND OF THE INVENTION

1. Field of the Invention

The present invention relates to an image processing apparatus configured to restore color image data that has been output as monochromatic image data. More specifically, the present invention relates to an image processing apparatus configured to output color image data as monochromatic image data that can later be restored as color image data, an image processing apparatus control method, a program, and a storage medium therefor.

2. Description of the Related Art

In recent years, users of an image processing apparatus have desired to obtain color image data or a color print product from monochromatic image data or a monochromatic print product.

Suppose a case where a presenter performs a presentation during a business conference using a monochromatic print product distributed to each participant. In this case, the presenter performs the presentation using color presentation data on a screen for a projector (image display apparatus) installed in front of the participants in the conference room.

With this environment, in this case, the participants sometimes refer to the distributed monochromatic print product while looking at the presentation data displayed on the screen. With this environment, the participants would not feel inconvenience during the conference because they can recognize what has been presented by looking at the color presentation data displayed on the display screen even though the distributed material is a monochromatic print product.

However, when the participants looks at the monochromatic print product in their own office or at home, the participants may desire to obtain and use color image data or a color print product from the monochromatic print product, because the monochromatic print product, which does not have sufficient amount or quality of data, may be inconvenient for the participants.

As described above, the market has demanded an image processing apparatus or a method that enables a user to obtain color image data or a color print product from or based on monochromatic image data or a monochromatic print product. The following three conventional methods, for example, can satisfy that demand.

Japanese Patent Application Laid-Open No. 01-197878 discusses a method for printing, on a print paper (recording medium), a bar code describing address data of a server apparatus that stores original color image data. With this method, when the print paper having the bar code is scanned with a scanning unit of a client apparatus (image processing apparatus) connected to the server apparatus directly or via a network, the image processing apparatus refers to the sever apparatus based on the address data described in the bar code. Then, the image processing apparatus reads the original color image data from the server apparatus, and then prints out the read original color image data.

Japanese Patent Application Laid-Open No. 10-126607 discusses a method for printing out original color image, which is described as a bar code, on a print paper. With this method, an image processing apparatus scans and reads the bar code describing the original color image data, and then prints out the read original color image data.

Japanese Patent Application Laid-Open No. 08-279896 discusses a method in which an image processing apparatus searches for and extracts, from color image data, an area whose color is neither white nor black to obtain color data (not color-difference data). In this method, the image processing apparatus generates a bar code describing positional data and color data about each object. Furthermore, the image processing apparatus generates monochromatic image data from the color image data, and prints out the generated monochromatic image data, which has been obtained from the color image data, on a print paper together with the generated bar code. With this method, the image processing apparatus scans the print paper to read the bar code, and generates a color image using the color data described in the bar code.

However, with the method discussed in Japanese Patent Application Laid-Open No. 01-197878, it is necessary to provide and install a server. Furthermore, it is necessary for a user of a client apparatus connected to the server to upload onto the server image data to be printed in the case of a network copy job. Accordingly, under an office environment in which a large amount of data including documents and images is handled, it is inconvenient to store a large amount of image data on the server. Furthermore, in the case of transmitting large-size image data via the network or transmitting a large amount of image data at once via the network, the data communication network may be too busy.

Furthermore, with the method discussed in Japanese Patent Application Laid-Open No. 10-126607, it is necessary to generate a bar code of very-large-size color image data. Accordingly, the size of a bar code (including a two-dimensional bar code) may become very large.

More specifically, the size of color image data captured with a digital camera having an image sensor capable of capturing image data with a six million-pixel resolution for each color of red, green, and blue (RGB) may be as large as around 18 megabytes. On the other hand, the data amount of a bar code printed in an entire recordable area of an A4 size print paper can be around 1 kilobytes. That is, the ratio of the size of such color image data to the size of such a bar code is about 18,000:1.

As described above, Japanese Patent Application Laid-Open No. 08-279896 discusses a method in which an image processing apparatus searches for and extracts, from color image data, an area whose color is neither white nor black to obtain color data (not color-difference data). Here, the color data includes both luminance data (density data or monochromatic data, which is equivalent to luminance data) and color-difference data. Accordingly, the size of the color data can become large.

Thus, the actual size of a bar code generated based on such large-size color data may become very large.

It is desired by the market to address the above-described problems. More specifically, an image processing apparatus is desired and useful that is capable of reducing an amount of data required for converting image data, which has been output as monochromatic image data generated based on an original color data, into color image data later.

SUMMARY OF THE INVENTION

An embodiment of the present invention is directed to an image processing apparatus configured to output color image data as monochromatic image data that can later be restored as color image data and a control method therefor.

According to an aspect of the present invention, an embodiment is directed to an apparatus capable of processing luminance data and color-difference data of color image data. The apparatus includes a generation unit configured to generate digital watermark image data based on the color-difference data of the color image data, and an output unit configured to output the luminance data and the digital watermark image data generated by the generation unit. Color image data can be generated based on the digital watermark image data and the luminance data output from the output unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principle of the invention.

DETAILED DESCRIPTION OF THE EMBODIMENTS

Figure 1:
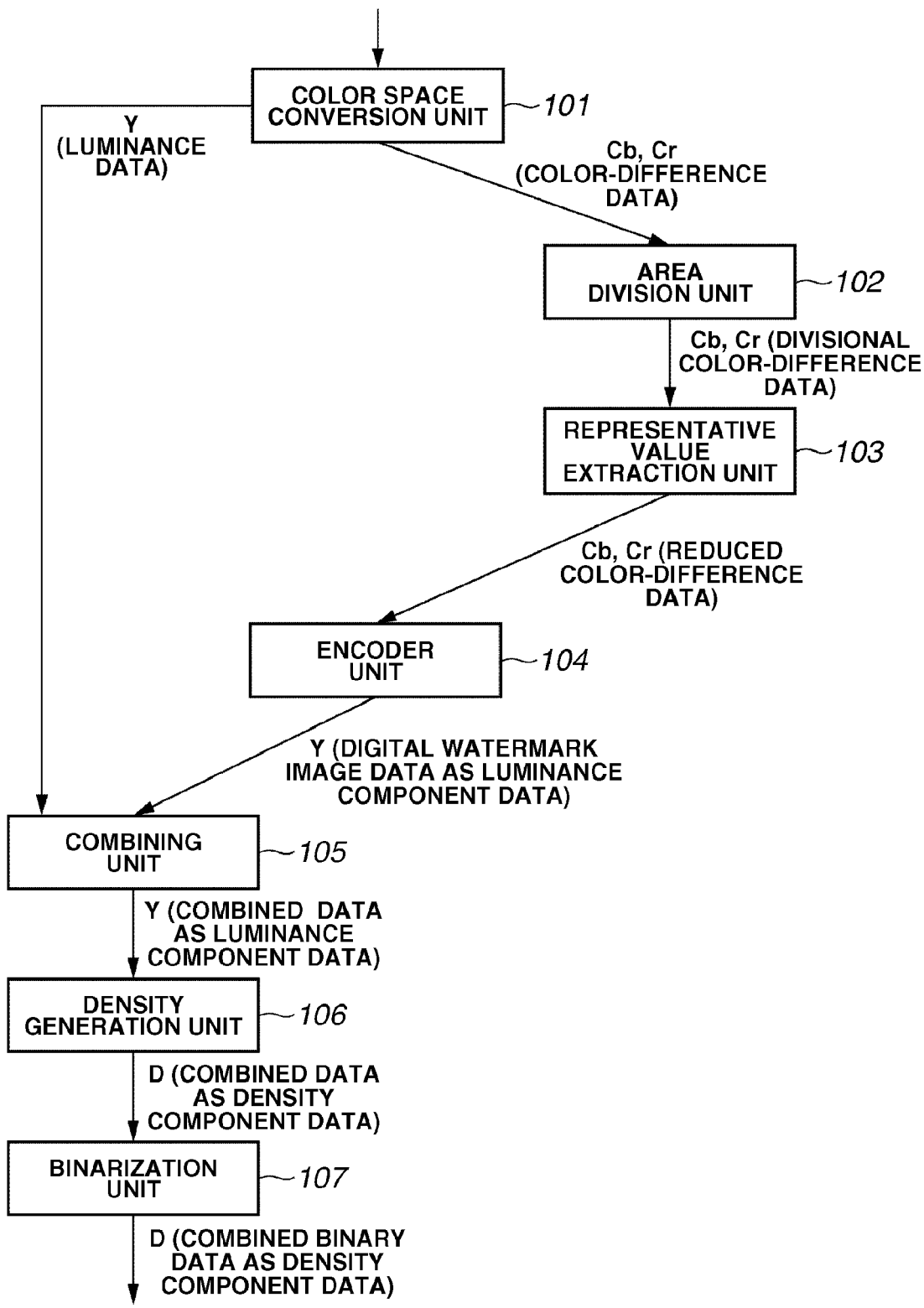
FIG. 1 illustrates an example of a configuration of an image processing apparatus that generates digital watermark image data according to an exemplary embodiment of the present invention.

Various exemplary embodiments, features, and aspects of the present invention will now herein be described in detail with reference to the drawings. It is to be noted that the relative arrangement of the components, the numerical expressions, and numerical values set forth in these embodiments are not intended to limit the scope of the present invention unless it is specifically stated otherwise.

First Exemplary Embodiment

Now, a first exemplary embodiment of the present invention will be described below. An image processing apparatus according to an exemplary embodiment is capable of generating a bar code including color-difference data, of luminance data and color-difference data in original color image data, and outputting a monochromatic image data together with the generated bar code, under an environment for printing monochromatic image data generated based on the original color image data. Furthermore, the image processing apparatus according to an exemplary embodiment is capable of reading a monochromatic print product having a bar code including color-difference data with a document reading apparatus, such as a scanner, and is capable of restoring original color image data based on monochromatic image data printed on the read monochromatic print product.

With a bar code including only color-difference data, instead of the entire color data, a data amount of the bar code can be sufficiently reduced.

First, a print system will be described that includes an image processing apparatus, a reading apparatus, and a printing apparatus configured to generate a bar code including only color-difference data, instead of the entire color data (luminance data and color-difference data), and to output monochromatic image data together with the generated bar code, under an environment in which a user desires to print original color image data by a monochromatic printing mode. Here, "original color image data" refers to color image data captured with a reading apparatus, such as a digital camera (digital still camera), or color image data obtained by scanning and reading a color document with a document reading apparatus.

The reading apparatus reads an original document or an original object as a color image in an RGB color space to generate an RGB color image data. Then, the reading apparatus outputs the generated RGB color image data to the image processing apparatus.

The image processing apparatus performs image processing on the RGB color image data received from the reading apparatus. Then, the image processing apparatus outputs monochromatic image data obtained as a result of the image processing to the printing apparatus.

The printing apparatus outputs the monochromatic image data received from the image processing apparatus on a paper sheet (print paper). That is, the printing apparatus generates a print product based on the monochromatic image data received from the image processing apparatus.

In an exemplary embodiment, the image processing apparatus and the printing apparatus are mutually separate apparatuses. However, the image processing apparatus and the printing apparatus can be integrated with each other. In the case of an integrated apparatus, the apparatus is hereinafter referred to as an "image forming apparatus". Furthermore, the image reading apparatus can be integrated with the image processing apparatus and the printing apparatus. Such and integrated apparatus is also hereinafter referred to as an "image forming apparatus".

Now, the image processing apparatus will be described that generates monochromatic image data based on color image data including RGB color data generated by the reading apparatus and outputs the generated monochromatic image data to the printing apparatus, with reference to FIGS. 1 through 4 and 7.

Each processing unit illustrated in FIGS. 1 through 4 and 7 is controlled by a central processing unit (CPU) of the image processing apparatus. A storage medium in the image processing apparatus stores a computer-recordable program defining content of processing performed by each processing unit. Here, the storage medium can include a hard disk drive (HDD), a flash memory, a compact disc-read only memory (CD-ROM), and a digital versatile disc (DVD). The CPU serially reads programs stored in the storage medium to control the processing performed by each processing unit.

Referring to FIG. 1, a color space conversion unit 101 separates the received color image data including RGB color data into luminance data and color-difference data. In the present exemplary embodiment, the color space after the data separation is not limited to a specific color space. That is, a YUV color space, an LAB color space, a YCbCr color apace, or an HSV color space can be used. An embodiment uses a YCbCr color space for the color space after the data separation.

Furthermore, in the present exemplary embodiment, a term "luminance" includes "L" in the LAB color space, which is generally referred to as "lightness", "V" in the HSV color space, which is generally referred to as "intensity", and "Y" in the YUV color space or the YCbCr color space, which is generally referred to as "luminance". In addition, a term "color-difference" includes "Cb" and "Cr" in the YCbCr color space, "U" and "V" in the YUV color space, and "A" and "B" in the LAB color space. It is to be noted that in the present exemplary embodiment, "H", which is generally referred to as "hue", and "S", which is generally referred to as "saturation", can be used instead of the term "color-difference".

That is, the term "luminance" refers to the level of lightness, darkness, density, or brightness, while the term "color-difference" refers to color components other than the lightness, darkness, density, or brightness.

The present exemplary embodiment uses the following expression for converting RGB data into YCbCr data. In the following expression, the dynamic range is "256", and each data can range from values "0" to "255". In the present exemplary embodiment, a "Y" channel is an example of a luminance channel, and a "CbCr" channel is an example of a color-difference channel.

$$Y = 0.29900 * R + 0.58700 * G + 0.11400 * B$$

$$Cb = -0.16874 * R - 0.33126 * G + 0.50000 * B + 128$$

$$Cr = 0.50000 * R - 0.41869 * G - 0.08131 * B + 128$$

$$R = Y + 1.40200 * (Cr - 128)$$

$$G = Y - 0.34414 * (Cb - 128) - 0.71414 * (Cr - 128)$$

$$B = Y + 1.77200 * (Cb - 128)$$

$$0 \leq R \leq 255, 0 \leq y \leq 255$$

$$0 \leq G \leq 255, 0 \leq Cb \leq 255$$

$$0 \leq B \leq 255, 0 \leq Cr \leq 255$$

After the data separation, the color space conversion unit 101 outputs the luminance data of the color image data to a combining unit 105. Furthermore, the color space conversion unit 101 outputs the color-difference data of the color image data to an area division unit 102.

Figure 8:
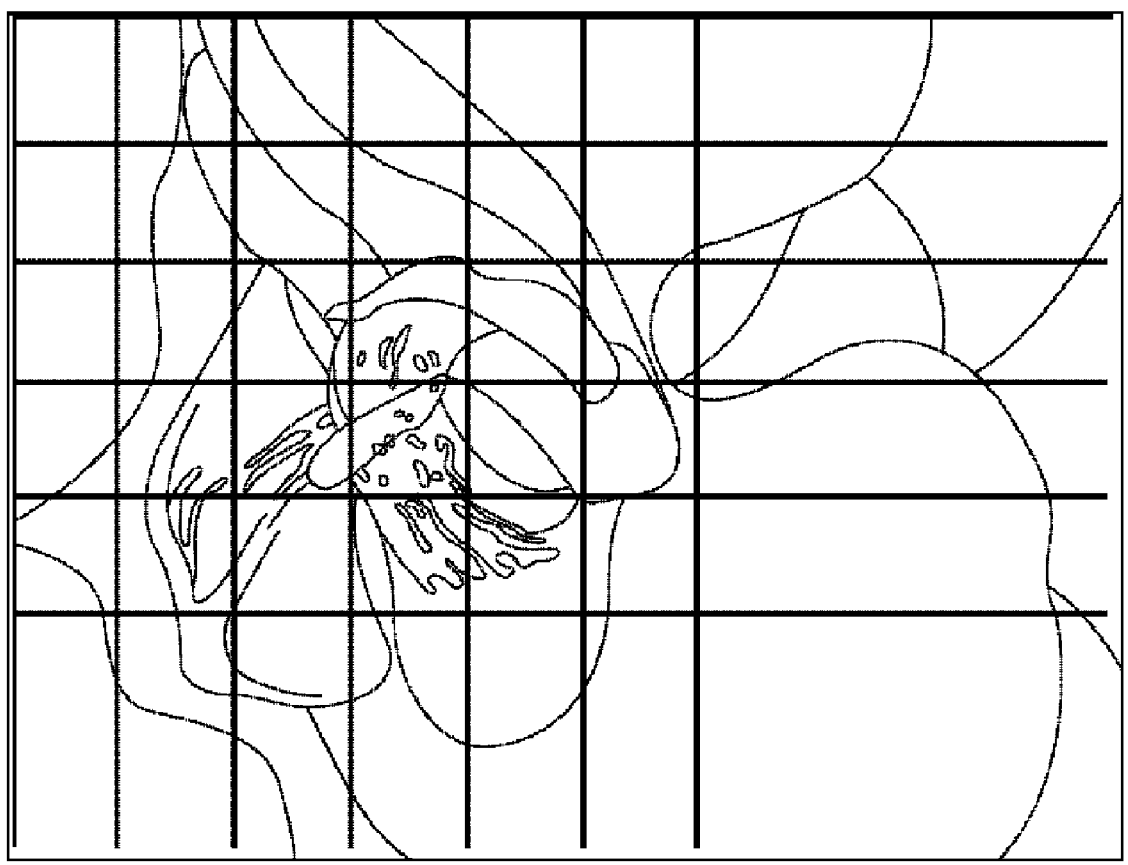
FIG. 8 illustrates an example of an image including a plurality of divided unit areas according to an exemplary embodiment of the present invention.

The area division unit 102 divides the received color-difference data into a plurality of unit areas (16×16 pixels, for example, as illustrated in FIG. 8). The area division unit 102 outputs, to a representative value extraction unit 103, a coordinate value corresponding to the color-difference data for each divided area and color-difference data for each divided area, as divisional color-difference data.

The representative value extraction unit 103 reduces data amount, from each of a plurality of received divisional color-difference data, on each divisional color-difference data, to obtain reduced color-difference data.

The processing for reducing the data amount will be described below.

First, the representative value extraction unit 103 extracts a representative value for each of the received divisional color-difference data. Then, the representative value extraction unit 103 forms an aggregate of each representative value and a coordinate value corresponding to each representative value (from a digital watermark image generated by an encoder unit 104). The aggregate is handled as reduced color-difference data.

The reduced color-difference data can include, instead of the aggregate of the coordinate values, positional information about a first unit area (from a digital watermark image generated by the encoder unit 104), the size of the unit area, and the number of unit areas in the vertical and horizontal directions. This can apply to exemplary embodiments other than the first exemplary embodiment of the present invention.

The representative value extraction unit 103 outputs the reduced color-difference data to the encoder unit 104. The representative value for the divisional color-difference data can be a divisional color-difference data average value $AVG_{ij}$. Furthermore, the representative value for the divisional color-difference data can be a direct current component and a low-frequency component obtained by frequency-decomposing the divisional color-difference data. Moreover, the representative value for the divisional color-difference data can be a color-difference value for an upper-left pixel or a center pixel in a unit area corresponding to the divisional color-difference data. That is, the representative value is a value representing the color-difference value in the unit area corresponding to the divisional color-difference data.

Figure 6:
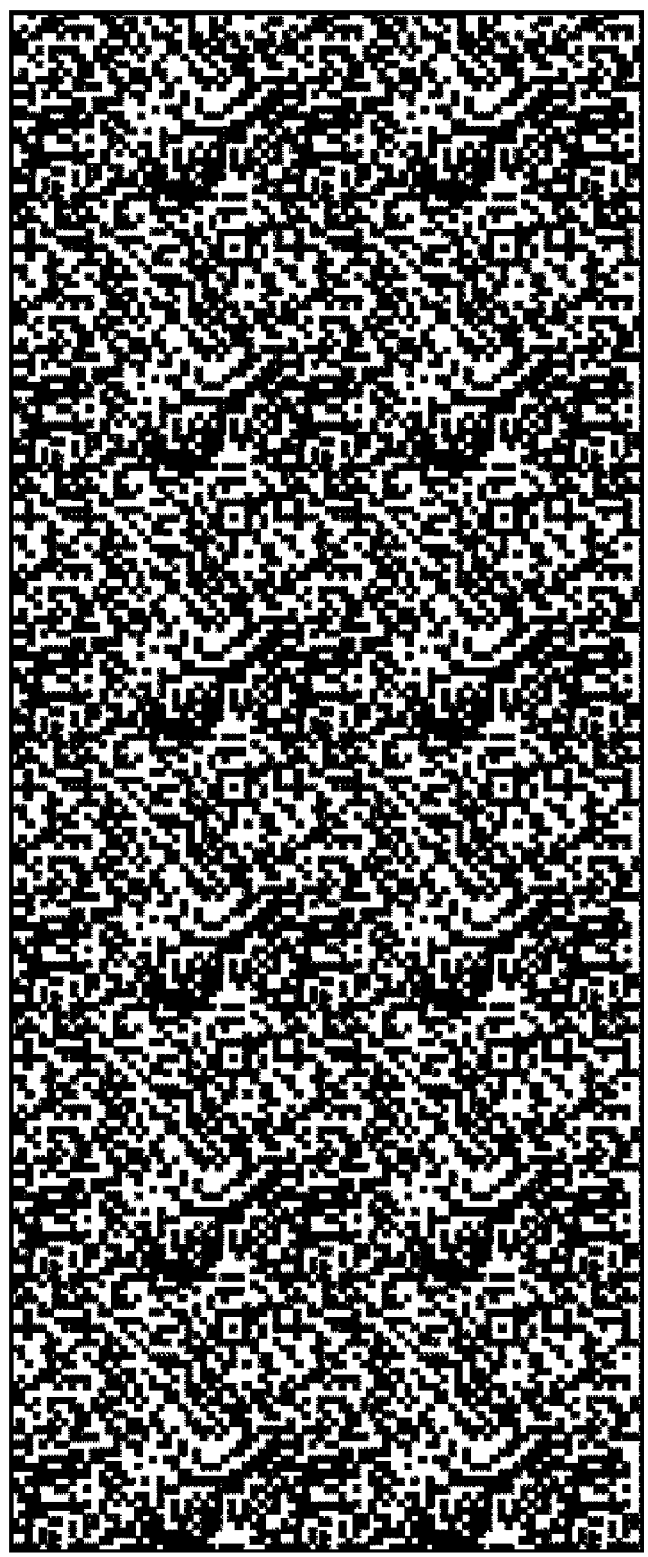
FIG. 6 illustrates an example of a digital watermark image according to an exemplary embodiment of the present invention.

The encoder unit 104 converts the aggregate received from the representative value extraction unit 103 into digital watermark image data. With this processing, the aggregate of representative values (and the coordinate value corresponding to the representative value) is converted into image data having a computer-readable digital format, for example, digital watermark image data as illustrated in FIG. 6.

In the context of the present specification, the term "digital watermark" is used to describe a two-dimensional bar code, a one-dimensional bar code, and a steganography. That is, a digital watermark image is defined as an image that includes computer-readable data. The computer-readable data cannot be comprehended by a human by looking at it, unless after being read and comprehended by a computer.

The digital watermark image data generated by the encoder unit 104 is to be later reversed by a density generation unit 106. Accordingly, the encoder unit 104 generates the digital watermark image data in a reversed state.

The encoder unit 104 outputs, to the combining unit 105, the digital watermark image data as luminance component data.

The combining unit 105 combines the luminance data received from the color space conversion unit 101 with the digital watermark image data (luminance component) received from the encoder unit 104, in a state of a luminance component. The combination is performed by an inclusive-OR combination.

Figure 9:
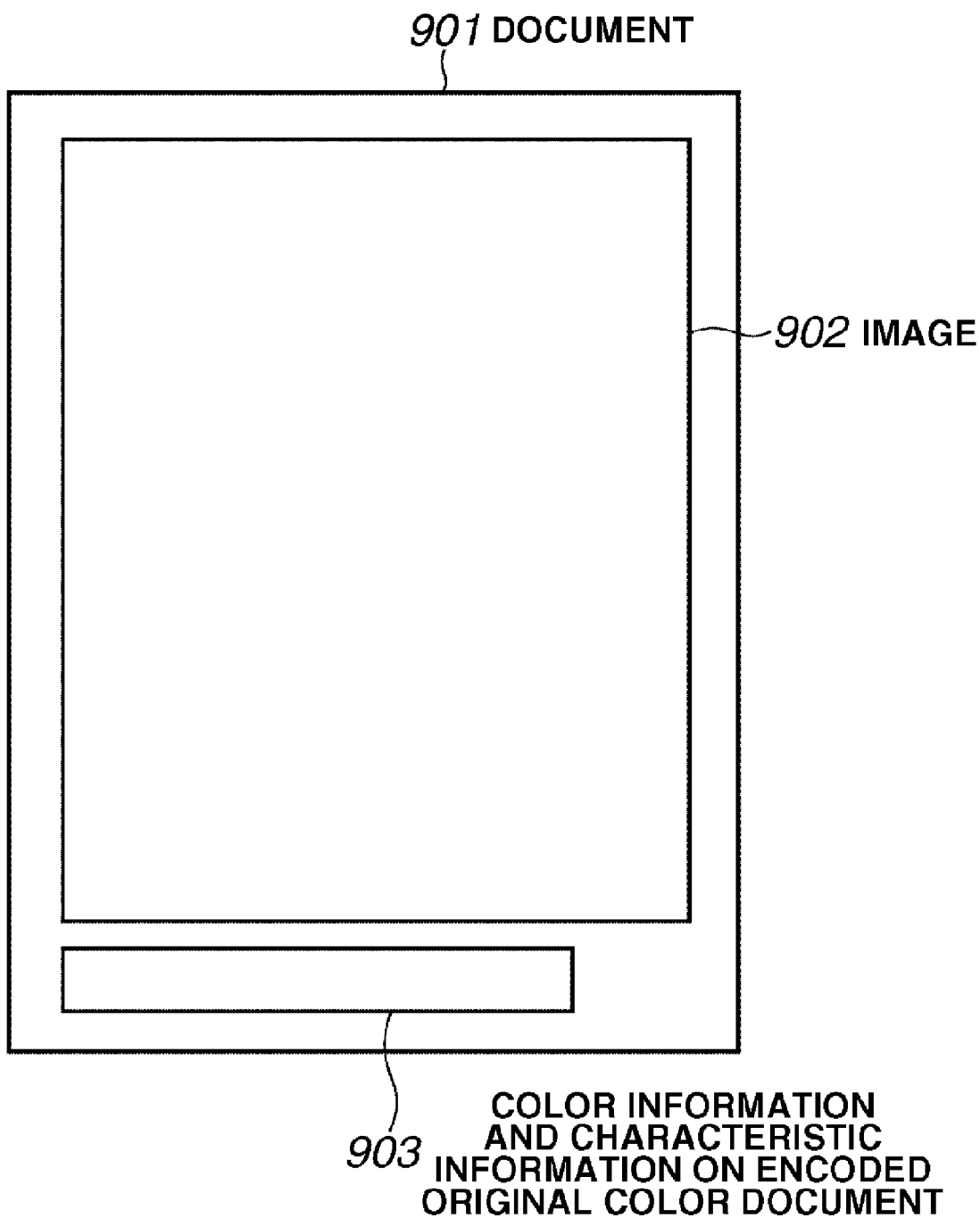
FIG. 9 illustrates an example of a monochromatic print image including a monochromatic bar code according to an exemplary embodiment of the present invention.

After the combining processing, the combining unit 105 outputs the combined data of the luminance component to the density generation unit 106. In the case where the size of the original color image data is smaller than the size of a recording paper, the combining unit 105 combines the digital watermark image data in a marginal portion of the luminance data, as illustrated in FIG. 9. In the case where the size of the original color image data is approximately as large as the size of a recording paper and thus no marginal portion is left, the combining unit 105 provides the digital watermark image data on a page different than the page for the luminance data (back side page or a subsequent page, for example).

In the present exemplary embodiment, providing the digital watermark image data on a page different than the page for luminance data can also be included in combining the digital watermark image data with the luminance data.

The density generation unit 106 reverses the combined data of the luminance component received from the combining unit 105 to convert the combined data of the luminance component into combined data of a density component. The density generation unit 106 obtains combined data of the density component by reversing the combined data of the luminance component.

For example, in the case where a dynamic range is "255" and a pixel value of a specific pixel in the combined data of the luminance component is "20", the density generation unit 106 sets the pixel value in the combined data of the density component at "235". In this manner, the digital watermark image data received from the combining unit 105 is reversed, and thus original digital watermark image data is obtained.

Then, the density generation unit 106 outputs the combined data of the density component to a binarization unit 107.

The binarization unit 107 converts the combined data of the density component received from the density generation unit 106 into data having a format with which the printing apparatus can print the data (into 1-bit binary data, for example). Then, the binarization unit 107 outputs the thus obtained binary combined data of the density component to the printing apparatus.

In the image processing apparatus illustrated in FIG. 1, the encoder unit 104 receives only the color-difference data output from the representative value extraction unit 103 and does not receive the luminance data from the color space conversion unit 101. On the other hand, in an image processing apparatus illustrated in FIG. 2, the encoder unit 104 receives a characteristic amount of the entire luminance data obtained by reducing the data amount of the luminance data at a very high reduction ratio, in addition to the reduced color-difference data output from the representative value extraction unit 103.

In the present exemplary embodiment, the characteristic amount of the entire luminance data obtained by reducing the data amount of the luminance data is sometimes referred to as "reduced luminance data".

Hereinbelow, in describing the image processing apparatus in FIG. 2, which is different from the image processing apparatus in FIG. 1, the color space conversion unit 101, a characteristic amount generation unit 201, and the encoder unit 104, which operate differently from those of the image processing apparatus in FIG. 1, will be described only.

The color space conversion unit 101 (FIG. 2) outputs the luminance data of the color image data to the characteristic amount generation unit 201, in addition to the processing by the color space conversion unit 101 (FIG. 1). The characteristic amount generation unit 201 (FIG. 2) generates a histogram of the entire received luminance data and extracts a characteristic amount of the generated histogram.

In the present exemplary embodiment, a "characteristic amount" is generated based on luminance values V1 and V2 (FIG. 5) at both ends of the histogram excluding a noise component. However, the present exemplary embodiment is not limited to this. That is, the "characteristic amount" can be generated based on luminance values of the entire histogram. Alternatively, the "characteristic amount" can be generated based on a luminance value(s) on one or more peaks in the histogram and the luminance data at both ends (V1, V2). In the present exemplary embodiment, the luminance values at both ends are used to generate the characteristic amount, for simpler understanding. As described above, a characteristic amount of specific data indicates statistics for the entire data.

In the present exemplary embodiment, 3% from a lowest value and 3% from a highest value, of the luminance value in the histogram, are defined as noises. Accordingly, the luminance value V1 is the lowest value of the luminance value except for a noise, and the luminance value V2 is the highest value of the luminance value except for a noise.

Figure 5:
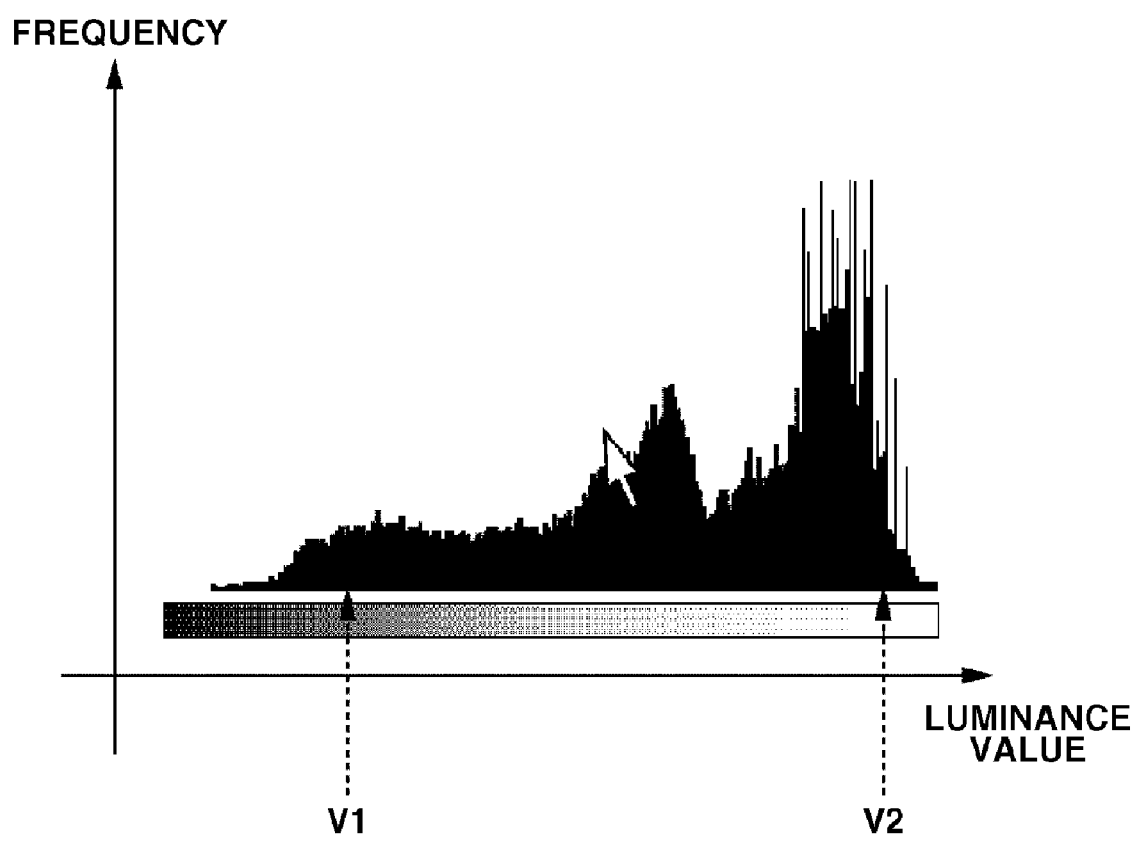
FIG. 5 illustrates an example of a histogram according to an exemplary embodiment of the present invention.

FIG. 5 is a histogram for the entire luminance data generated by the characteristic amount generation unit 201. In FIG. 5, the luminance value is taken on a horizontal axis, and a frequency is taken on the vertical axis.

After the above-described processing is completed, the characteristic amount generation unit 201 outputs the characteristic amount of the entire generated luminance data to the encoder unit 104.

The encoder unit 104 converts the aggregate of the representative values received from the representative value extraction unit 103 (and coordinate values corresponding thereto) and the characteristic amount for the entire luminance data received from the characteristic amount generation unit 201 into digital watermark image data of a luminance component.

As described above, in the image processing apparatus in FIG. 2, different from the image processing apparatus in FIG. 1, the digital watermark image data includes the characteristic amount of the entire luminance data in addition to the reduced color-difference data.

However, the characteristic amount of the entire luminance data is information obtained based on the histogram of the luminance data. Accordingly, the information amount of the characteristic amount of the entire luminance data is very small compared to the information amount of the reduced color-difference data. For example, the characteristic amount of the entire luminance data is generated based on the luminance values at both ends in the histogram as in the present exemplary embodiment, the information amount thereof is as small as 16 bits. The 16-bit information includes 8 bits for the luminance value V1 (V1 is an integer ranging from 0 to 255), and 8 bits for the luminance value V2 (V1 is an integer ranging from 0 to 255).

As described above, in the image processing apparatus in FIG. 2, the characteristic amount of the entire luminance data is included in the digital watermark image data. Accordingly, with the image processing apparatus in FIG. 2, color image data more similar to original color image data can be obtained with the restoration processing than in the case of using the image processing apparatus in FIG. 1.

Figure 2:
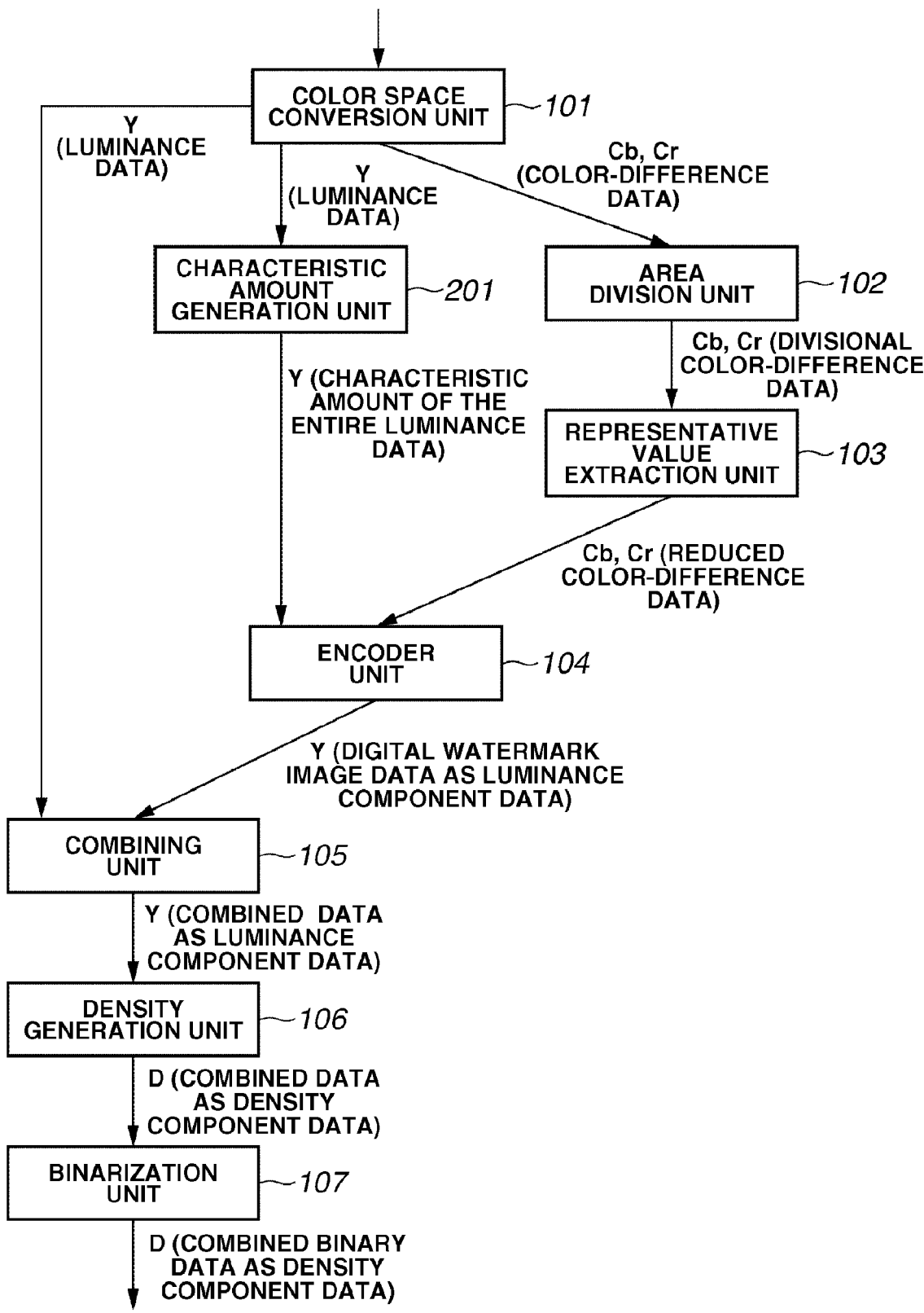
FIG. 2 illustrates an example of a configuration of an image processing apparatus including a characteristic amount generation unit according to an exemplary embodiment of the present invention.

Differently from the image processing apparatus in FIG. 1, the digital watermark image data generated by the image processing apparatus in FIG. 2 includes the characteristic amount of the luminance data in addition to color-difference data. However, the characteristic amount of the luminance data affects only a little the size of the digital watermark image data, because the characteristic amount of the luminance data has been reduced at a very high reduction ratio. For example, the characteristic amount of the luminance data is 16-bit data.

Figure 3:
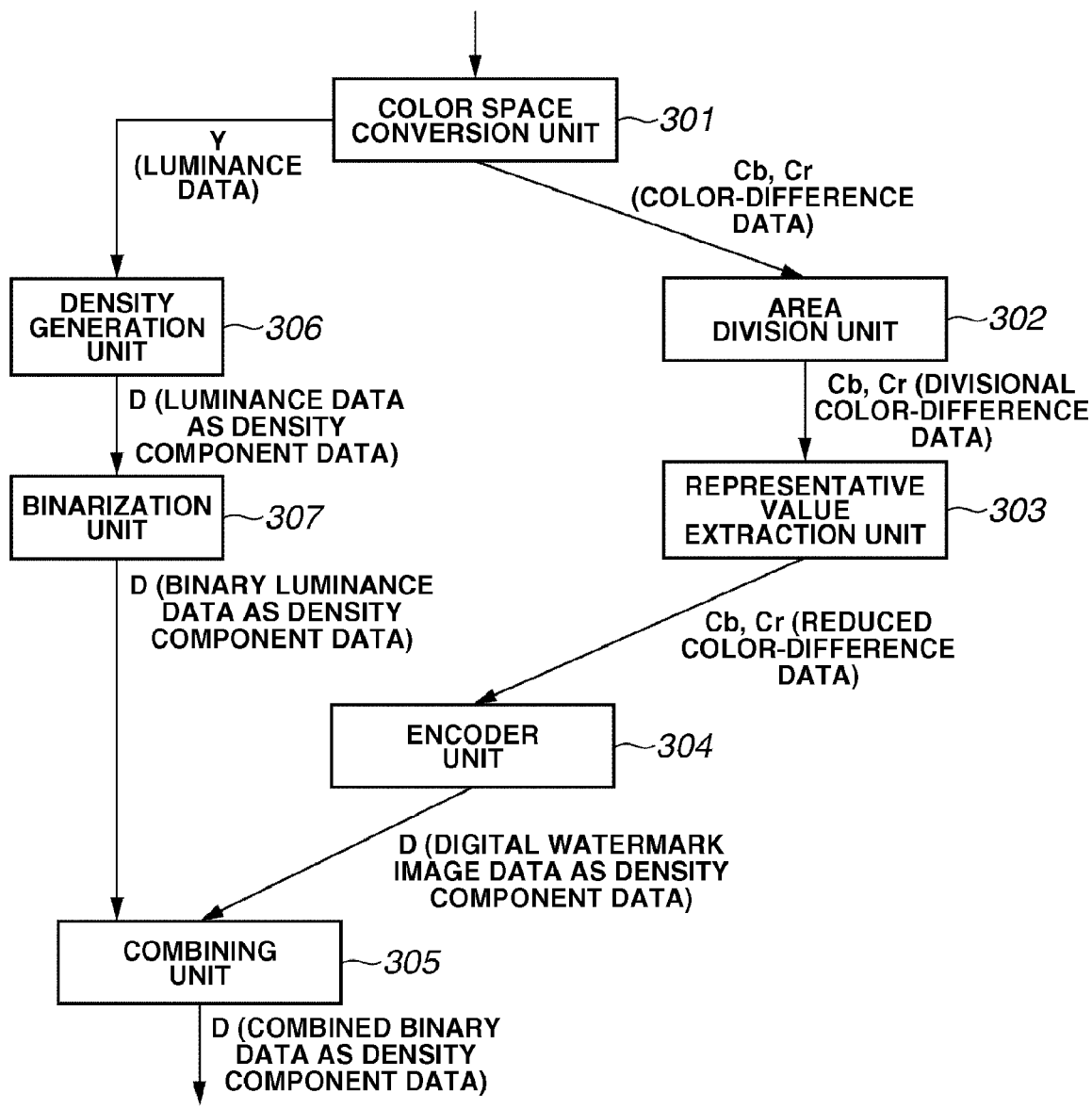
FIG. 3 illustrates an example of a configuration of an image processing apparatus including a density generation unit at a stage earlier than a combining unit according to an exemplary embodiment of the present invention.

An image processing apparatus illustrated in FIG. 3 includes a density generation unit 306 and a binarization unit 307 as early stage units unlike the image processing apparatus illustrated in FIG. 1. Furthermore, an encoder unit 304 outputs digital watermark image data to a combining unit 305 as data of a density component instead of a luminance component.

As described above, the image processing apparatus in FIG. 3 is basically similar to that in FIG. 1. Accordingly, the image processing apparatus in FIG. 3 will be described focusing on difference points from the image processing apparatus in FIG. 1.

Referring to FIG. 3, a color space conversion unit 301 separates the received color image data including RGB color data into luminance data and color-difference data. Then, the color space conversion unit 301 outputs the luminance data to the density generation unit 306. Furthermore, the color space conversion unit 301 outputs the color-difference data to an area division unit 302.

The area division unit 302 performs processing similar to that performed by the area division unit 102 in FIG. 1. Accordingly, the area division unit 302 will not be described here. A representative value extraction unit 303 performs processing similar to that performed by the representative value extraction unit 103 in FIG. 1. Accordingly, the representative value extraction unit 303 will not be described here.

The encoder unit 304 converts the aggregate of the representative values received from the representative value extraction unit 303 (and coordinate values corresponding thereto) into digital watermark image data of a density component. Then, the encoder unit 304 outputs the digital watermark image data of the density component to the combining unit 305.

In the case of using the image processing apparatus in FIG. 1, the encoder unit 104 generates digital watermark image data in a reversed state. On the contrary, the image processing apparatus in FIG. 3 does not generate digital watermark image data in a reversed state. This is because in the image processing apparatus in FIG. 3, the density generation unit 306 is disposed at an earlier stage than the combining unit 305, and thus the digital watermark image data is not reversed later.

The density generation unit 306 reverses the luminance data received from the color space conversion unit 301, converts the luminance data into luminance data of a density component, and the outputs the luminance data of the density component to the binarization unit 307.

The binarization unit 307 converts the luminance data of the density component received from the density generation unit 306 into data having an information amount with which the printing apparatus can print the data (into 1-bit binary data, for example). Then, the binarization unit 307 generates binary luminance data of the density component. Furthermore, the binarization unit 307 outputs the generated binary luminance data to the combining unit 305.

The combining unit 305 combines the binary luminance data of the density component received from the binarization unit 307 and the binary digital watermark image data of the density component received from the encoder unit 304 to generate binary combined data of the density component. Then, the combining unit 305 outputs the generated binary combined data of the density component to the printing apparatus.

In an image processing apparatus in which the density generation unit 306 is disposed at an earlier stage than the combining unit 305, such as the one illustrated in FIG. 3, the digital watermark image data can be generated without reversing, contrary to the image processing apparatus in FIG. 1. Thus, the processing load is small with the image processing apparatus in FIG. 3.

In the image processing apparatus in FIG. 3, the encoder unit 304 receives only the reduced color-difference data output from the representative value extraction unit 303 and does not receive luminance data from the color space conversion unit 301.

Figure 4:
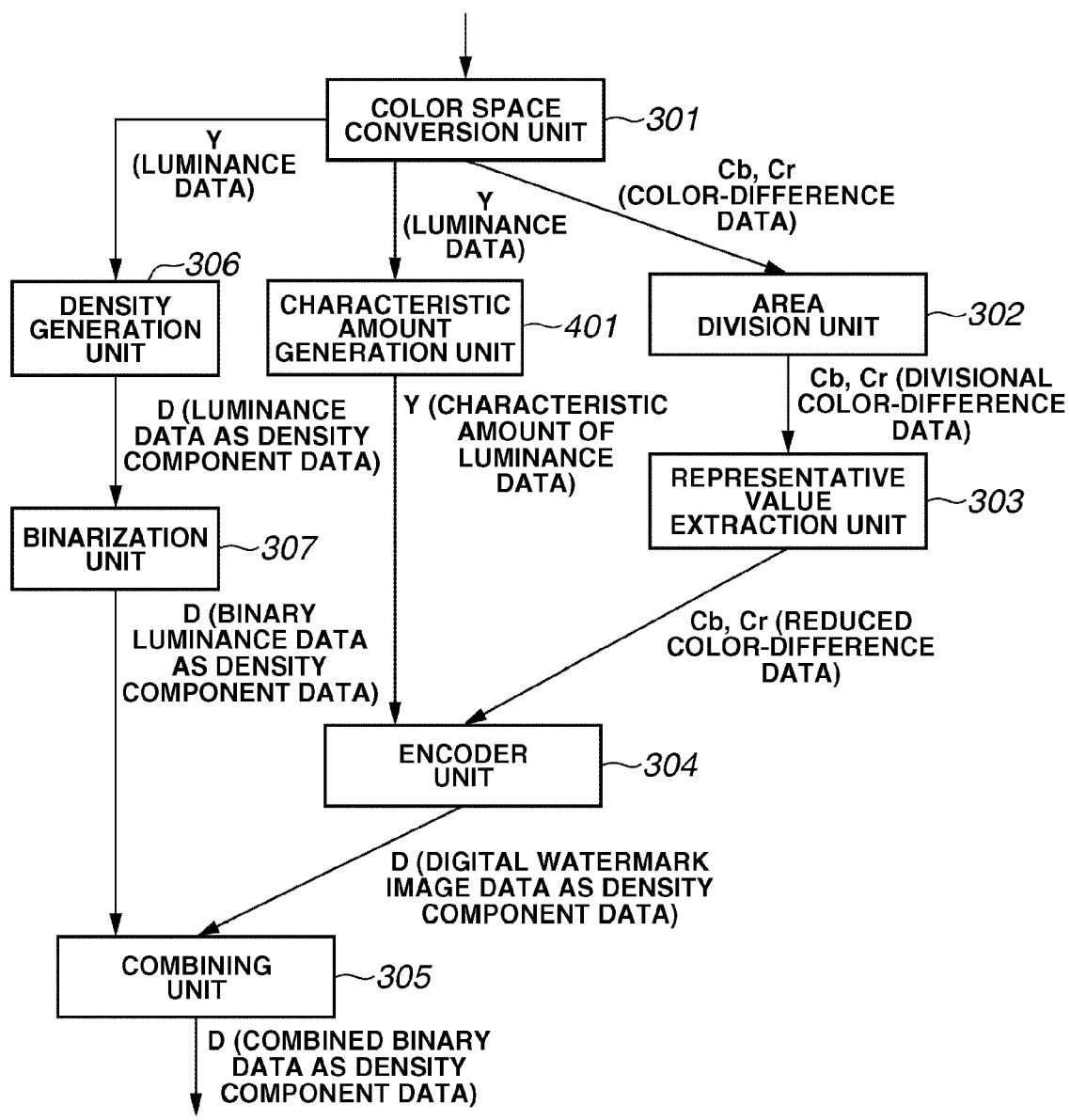
FIG. 4 illustrates an example of a configuration of an image processing apparatus including a characteristic amount generation unit according to an exemplary embodiment of the present invention.

On the other hand, the encoder unit 304 in an image processing apparatus illustrated in FIG. 4 receives a characteristic amount of the luminance data whose data amount has been reduced at a very high reduction ratio (that is, the entire luminance data has been reduced), in addition to the reduced color-difference data output from the representative value extraction unit 303. The very high reduction ratio is higher than the reduction ratio in the data amount reduction processing on the color-difference data.

Hereinbelow, in describing the image processing apparatus in FIG. 4, which is different from the image processing apparatus in FIG. 3, only the color space conversion unit 101, a characteristic amount generation unit 401, and the encoder unit 304, which operate differently from those of the image processing apparatus in FIG. 1, will be described.

The color space conversion unit 301 (FIG. 4) outputs the luminance data to the characteristic amount generation unit 401, in addition to the processing performed by the color space conversion unit 301 (FIG. 3). The characteristic amount generation unit 401 (FIG. 4) extracts a characteristic amount of the received luminance data, similar to the characteristic amount generation unit 201 in FIG. 2.

The encoder unit 304 converts the aggregate of the representative values received from the representative value extraction unit 303 (and coordinate values corresponding thereto) and the characteristic amount received from the characteristic amount generation unit 401 into digital watermark image data.

As described above, the image processing apparatus in FIG. 4, different from the image processing apparatus in FIG. 3, adds the characteristic amount of the entire luminance data to the reduced color-difference data, and thus the digital watermark image data includes the characteristic amount of the entire luminance data.

As described above, in the image processing apparatus in FIG. 4, the characteristic amount is included in the digital watermark image data. Accordingly, with the image processing apparatus in FIG. 4, color image data more similar to original color image data can be obtained with the restoration processing, than in the case of using the image processing apparatus in FIG. 3.

Differently from the image processing apparatus in FIG. 3, the digital watermark image data generated by the image processing apparatus in FIG. 4 includes the characteristic amount of the luminance data, in addition to color-difference data. However, the size of the digital watermark image data can be small because the characteristic amount of the luminance data has been reduced at a very high reduction ratio.

Now, a printing system that restores color image data based on the monochromatic print product obtained as described above will be described below. The printing system includes a reading apparatus, an image processing apparatus, and a printing apparatus.

The reading apparatus reads the print product to generate RGB image data. Then, the reading apparatus outputs the generated RGB image data to the image processing apparatus.

The image processing apparatus performs image processing on the RGB image data received from the reading apparatus. Then, the image processing apparatus outputs the color image data obtained by the image processing to the printing apparatus.

The printing apparatus outputs the color image data received from the image processing apparatus onto a paper sheet (recording medium). The printing system can be similar to that described above or a printing system other than that described above.

Now, an image processing apparatus that restores color image data having RGB color data and generated using the reading apparatus and outputs the restored color image data to the printing apparatus will be described with reference to FIG. 7.

Figure 7:
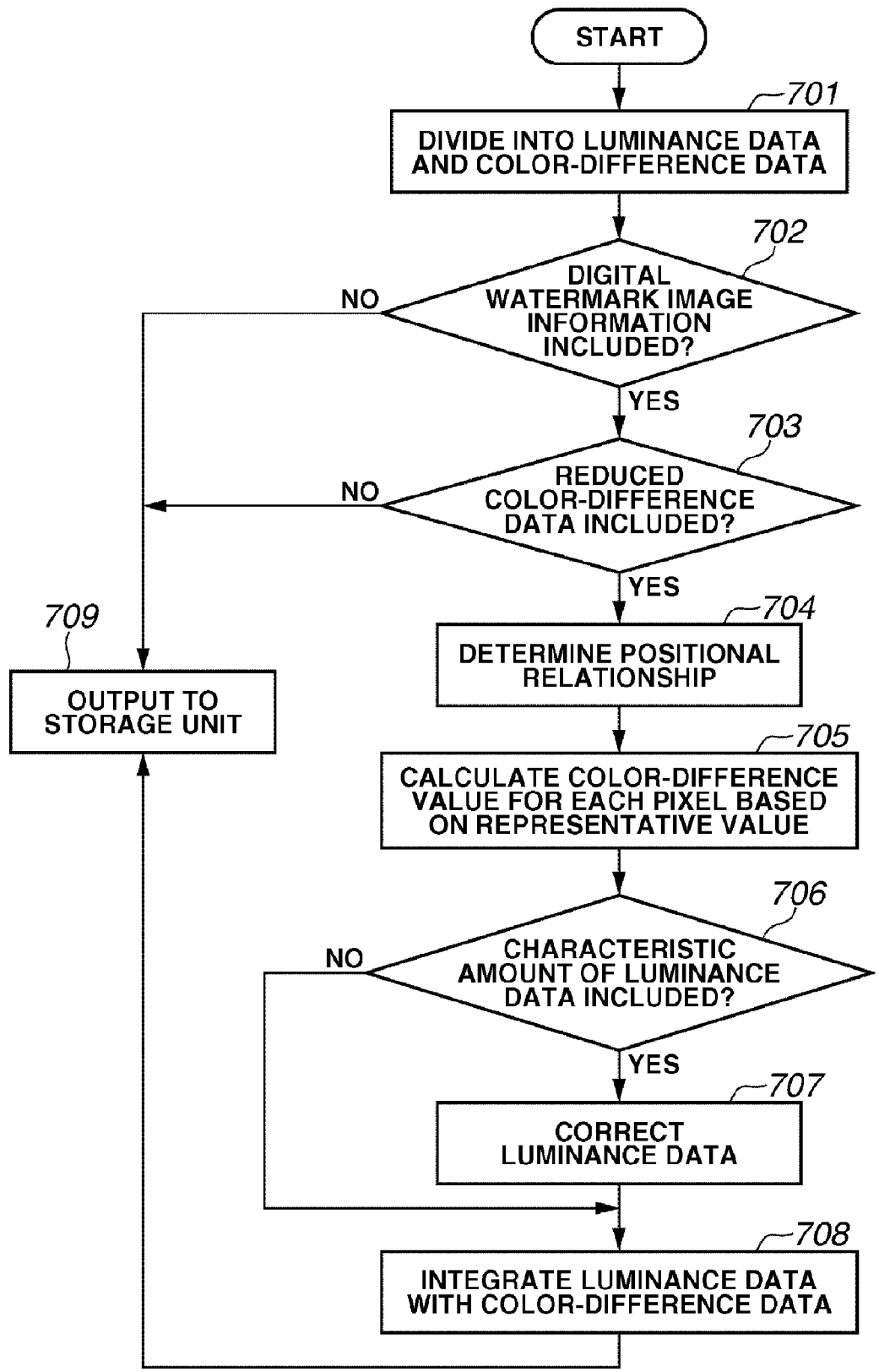
FIG. 7 is a flow chart illustrating an exemplary flow of restoration processing according to an exemplary embodiment of the present invention.

The processing in each step in FIG. 7 can be performed with a CPU of the image processing apparatus. A storage medium (an HDD, a flash memory, a CD-ROM, or a DVD) of the image processing apparatus stores a computer-readable program that defines content of the processing in each step of the flow chart in FIG. 7. That is, the CPU serially reads the program from the storage medium to perform processing in each step.

FIG. 7 is a flow chart illustrating an example of processing performed by the image processing apparatus in the printing system. The CPU of the image processing apparatus controls the entire image processing apparatus by performing each step in FIG. 7.

Referring to FIG. 7, in step 701, the CPU separates the RGB image data read with the reading apparatus into luminance data and color-difference data. In the present exemplary embodiment, the RGB data read with the reading apparatus is referred to as "read image data".

In step 702, the CPU determines whether digital watermark image data is included in the luminance data. If it is determined in step 702 that digital watermark image data is not included in the luminance data (NO in step 702), then the processing advances to step 709. In step 709, the CPU outputs the luminance data and the color-difference data to a storage unit. On the other hand, if it is determined in step 702 that digital watermark image data is included in the luminance data (YES in step 702), then the CPU advances to step 703.

In step 703, the CPU decodes the digital watermark image data and determines whether reduced color-difference data (an aggregate of representative values for the color-difference data in each area and coordinate values corresponding thereto) can be obtained. If it is determined in step 703 that reduced color-difference data cannot be obtained (NO in step 703), then the CPU advances to step 709. In step 709, the CPU outputs the luminance data and color-difference data to the storage unit.

In step 704, the CPU determines to which area (area of 16×16 pixels) of the luminance data obtained in step 701 each coordinate value (corresponding to the representative value for the color-difference data) in the reduced color-difference data corresponds. In other words, the CPU serially determines a positional relationship between the luminance data obtained in step 701 and the representative value for the color-difference data in each area included in the digital watermark image data.

In determining the positional relationship in step 704, it is useful to determine the positional relationship after correcting an inclination or deviation occurring at the time of printing or reading.

In step 705, the CPU determines a color-difference value for all of the pixels in each area (a color-difference value for the 256 pixels in a 16×16 pixels area, for example) based on the representative value for the color-difference data in each area (an average color-difference value in a 16×16 pixels area, for example). Then, the CPU uses the determined color-difference value for all of the pixels to replace the color-difference data obtained in step 701. That is, the CPU uses the color-difference value for all of the pixels obtained in step 705 as the color-difference data.

In step 706, the CPU determines whether a characteristic amount of the entire luminance data exists in the digital watermark image data.

If it is determined in step 706 that no characteristic amount of the entire luminance data exists in the digital watermark image data (NO in step 706) (if the digital watermark image data has been generated by the image processing apparatus in FIG. 1 or FIG. 3), then the CPU advances to step 708.

On the other hand, if it is determined in step 706 that a characteristic amount for the entire luminance data exists in the digital watermark image data (YES in step 706), then the CPU advances to step 707. In step 707, the CPU corrects the luminance data.

More specifically, in step 707, the CPU corrects the luminance data obtained in step 701 by using the characteristic amount (at both ends in the histogram in the Y channel (V1, V2) in FIG. 5, for example) for the entire luminance data in the digital watermark image data. The CPU performs the correction processing to match the characteristic amount of the luminance data obtained in step 701 (luminance data obtained by scanning) with the characteristic amount of the luminance data of the original color image data.

The correction is performed by the following expression in the case where the luminance values V1 and V2 are defined as the characteristic amount for the entire luminance data.

$$V' = \frac{V_2(\text{origin}) - V_1(\text{origin})}{V_2(\text{scan}) - V_1(\text{scan})} V + \frac{V_1(\text{origin})V_2(\text{scan}) - V_1(\text{scan})V_2(\text{origin})}{V_2(\text{scan}) - V_1(\text{scan})}$$

where $V_1$ (origin) indicates the luminance value V1 that has been generated by the characteristic amount generation unit 201 or 401, and $V_2$ (origin) indicates the luminance value V2 that has been generated by the characteristic amount generation unit 201 or 401.

In step 707, before correcting the luminance data obtained in step 701, the CPU calculates characteristic amounts of the luminance data obtained in step 701 ($V_1$ (scan) and $V_2$(scan)).

More specifically, the characteristic amounts of the luminance data obtained in step S01 ($V_1$ (scan) and $V_2$ (scan)) are calculated by the following processing.

First, the CPU generates a histogram based on the luminance data obtained in step 701 (luminance data obtained by scanning). Then, the CPU takes the smallest value in the generated histogram, except for a noise component, as "$V_1$ (scan)". Furthermore, the CPU takes the largest value in the generated histogram, except for a noise component, as "$V_2$ (scan)".

In the above expression, "V" stands for the luminance value before correcting each pixel in the luminance data obtained in step 701. "V'" stands for the luminance value after correcting each pixel in the luminance data obtained in step 701. Thus, the CPU obtains an aggregate of V's (luminance value after correcting each pixel) as the corrected luminance data.

In step 708, the CPU integrates the thus obtained luminance data with the color-difference data obtained in step 705. Thus, the CPU generates restored color image data (Y, Cb, Cr).

With the processing in step 708, the CPU uses the color-difference values for all of the images that have been determined based on the reduced color-difference data in the digital watermark image data to color the obtained luminance data.

In step 709, the CPU outputs the restored color image data to the storage unit.

With the above-described processing, color image data can be restored using the color-difference data in the monochromatic image data.

The CPU reads the restored color image data from the storage unit, and then converts the read restored color image data into cyan, magenta, yellow, and black (CMYK) color image data. Then, the CPU binarizes the converted restored CMYK color image data and outputs the thus obtained binary CMYK color image data to the printing apparatus.

Then, the printing apparatus outputs the CMYK color image data onto a sheet (print paper).

With the above-described processing, the present exemplary embodiment can restore color image data based on small size digital watermark image data in a monochromatic print product and luminance data of the monochromatic print product.

Second Exemplary Embodiment

In the above-described first exemplary embodiment, in step 705, the CPU replaces the color-difference data obtained by scanning into color-difference data included in the digital watermark image data.

More specifically, the CPU changes the color-difference data for each pixel in a unit area obtained by scanning using the representative value for the color-difference data included in the digital watermark image data as the color-difference data in the unit area.

Figure 10:
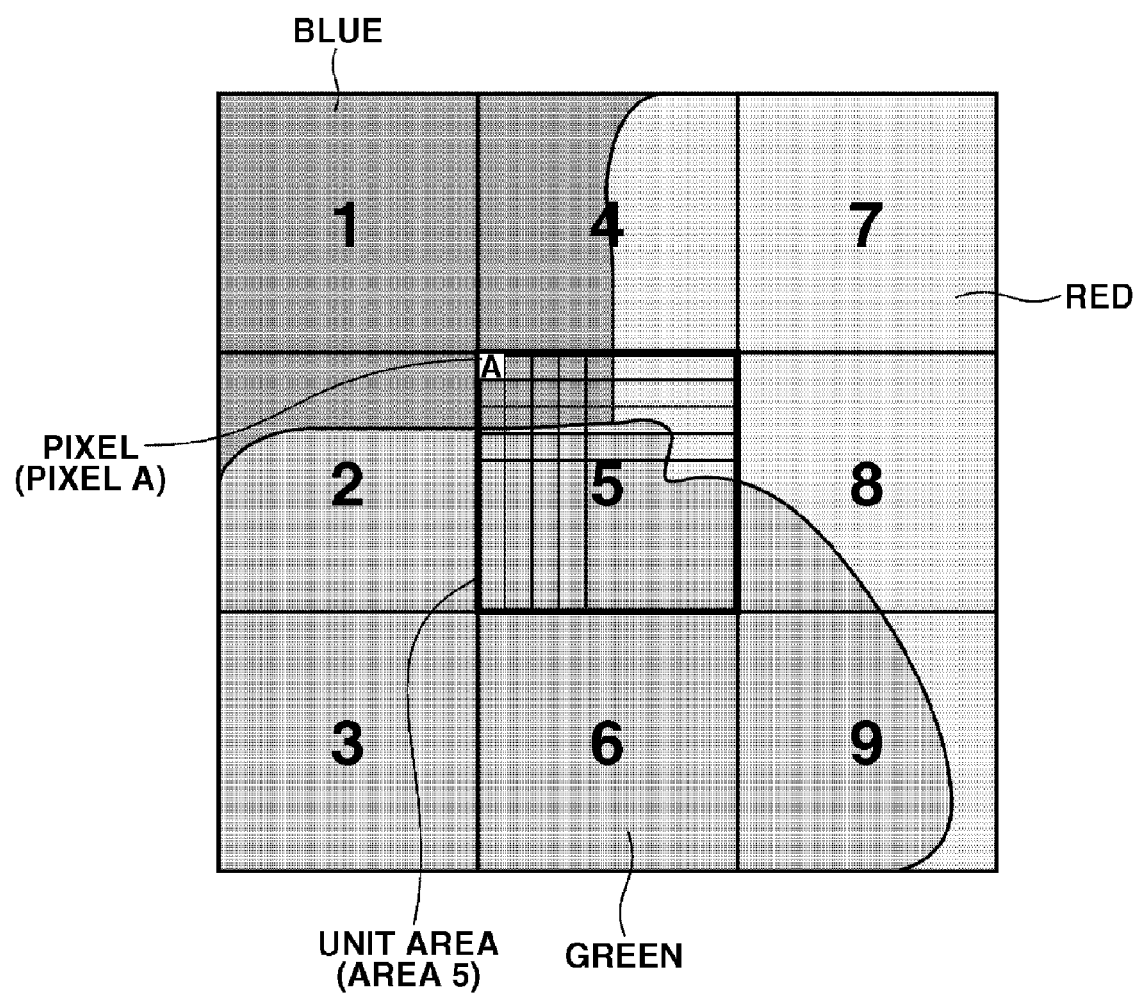
FIG. 10 illustrates the usefulness of performing restoration processing using a representative value in neighboring areas according to an exemplary embodiment of the present invention.
Figure 11:
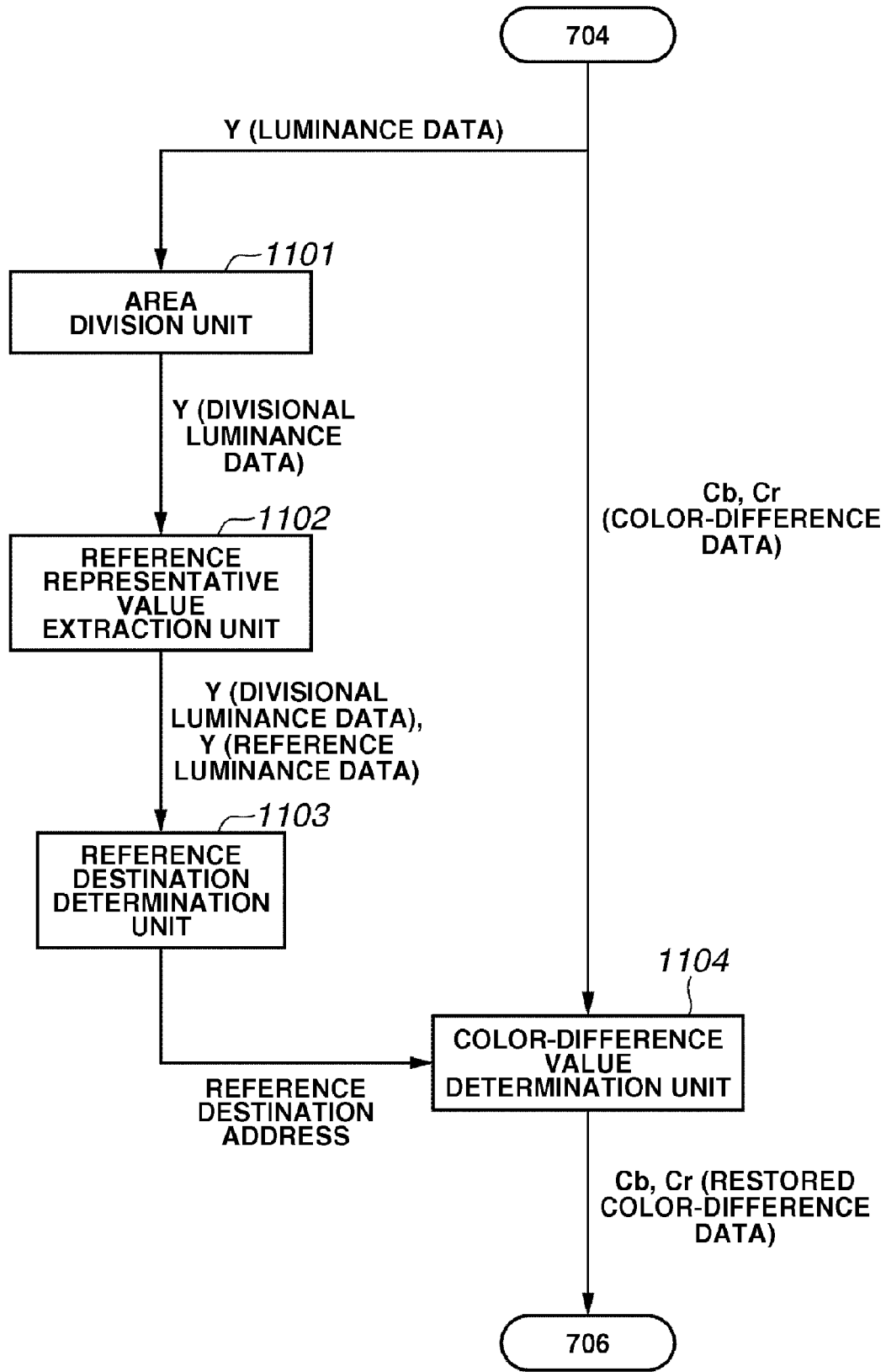
FIG. 11 is a flow chart illustrating an exemplary flow of restoration processing utilizing neighboring areas according to an exemplary embodiment of the present invention.

In a second exemplary embodiment, the CPU performs processing in FIG. 11 instead of the processing in step 705 in the first exemplary embodiment, for the following reasons. The reasons will be simply described below with reference to FIG. 10.

Referring to FIG. 10, an area 5 of the image illustrated in FIG. 10 includes a blue pixel, a red pixel, and a green pixel.

FIG. 10 illustrates an example of a 48×48 pixel image. Here, the area 5 is a 16×16 pixel unit area. Areas 1 through 4 and 6 through 9 are unit areas located adjacent to the area 5. In the second exemplary embodiment, the unit areas 1 through 9 (including the area 5) are referred to as "neighboring areas".

If such an image is printed with the image processing apparatus illustrated in any of FIGS. 1 through 4, the area 5 is printed with the color of black. In this case, the value included in the digital watermark image data as the color-difference data for the area 5 includes values for a blue pixel, a red pixel, and a green pixel as a mixture thereof.

When the print product is copied according to the processing flow in FIG. 7, the color of all of the pixels in the area 5 becomes a mixture of blue, red, and green according to the processing in step 705.

However, with such processing, the color shifts for every 16 pixels. Accordingly, a resulting copy product may not have a smooth color gradation.

Furthermore, although a pixel A in the area 5 is originally blue, if the print product is copied according to the processing flow in FIG. 7, the pixel A is reproduced in a color including blue, red, and green in a mixture on a resulting copy product.

The second exemplary embodiment is a method for implementing more accurate color reproduction on a copy product than that in the first exemplary embodiment.

More specifically, in the second exemplary embodiment, information included in the digital watermark image as the color-difference data for the eight unit areas (unit areas 1 through 4 and 6 through 9) surrounding the area 5 is used in addition to the information included in the digital watermark image as the color-difference data for the area 5.

In the second exemplary embodiment, a unit area and the unit areas surrounding the unit area are referred to as "neighboring areas".

In the second exemplary embodiment, nine unit areas are used as the neighboring areas. However, ten or more unit areas (sixteen unit areas or twenty-five unit areas, for example) can be used as the neighboring areas.

As described above, in the second exemplary embodiment, the processing in FIG. 11 is performed instead of performing the processing in step 705 in the first exemplary embodiment.

Referring to FIG. 11, an area division unit 1101 divides the received luminance data into a plurality of unit areas (for example, into unit areas of 16×16 pixels (FIG. 8)).

The area division unit 1101 outputs, to a reference representative value extraction unit 1102, data obtained by integrating a coordinate value corresponding to the luminance data in each unit area obtained by the area division with the luminance data for each pixel existing in each area obtained by the area division, as divisional luminance data.

The reference representative value extraction unit 1102 performs processing for acquiring reference data for each divisional luminance data based on each of the received plurality of divisional luminance data, to obtain reference luminance data. The processing for acquiring reference data is as follows.

First, the reference representative value extraction unit 1102 extracts a representative value for each divisional luminance data, which will be described in detail later below, from each received divisional luminance data.

Then, the reference representative value extraction unit 1102 forms an aggregate of each representative value and a coordinate value corresponding to each representative value (namely, a coordinate value for the unit area included in the divisional luminance data, from which each representative value is extracted), and uses the aggregate as reference luminance data. Then, the reference representative value extraction unit 1102 outputs the divisional luminance data and the reference luminance data to a reference destination determination unit 1103.

The representative value for the divisional luminance data can be a value representative of the luminance value in the unit area corresponding to the divisional luminance data. That is, a divisional luminance data average value $AVG_{ij}$ can be used for the representative value for the divisional luminance data. Furthermore, the representative value for the divisional luminance data can be a direct current component and a low-frequency component obtained by frequency-decomposing the divisional luminance data. Moreover, the representative value for the divisional luminance data can be a luminance value for an upper-left pixel or a center pixel in a unit area corresponding to the divisional luminance data.

Figure 12:
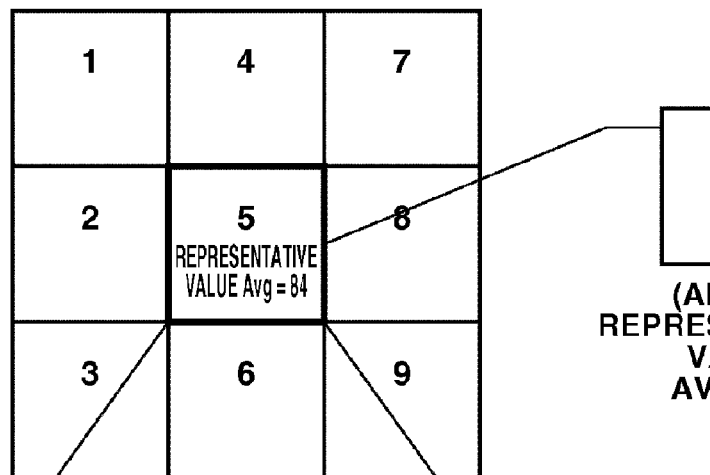
FIG. 12 illustrates an example of divisional luminance data and a representative value according to an exemplary embodiment of the present invention.
Figure 12:
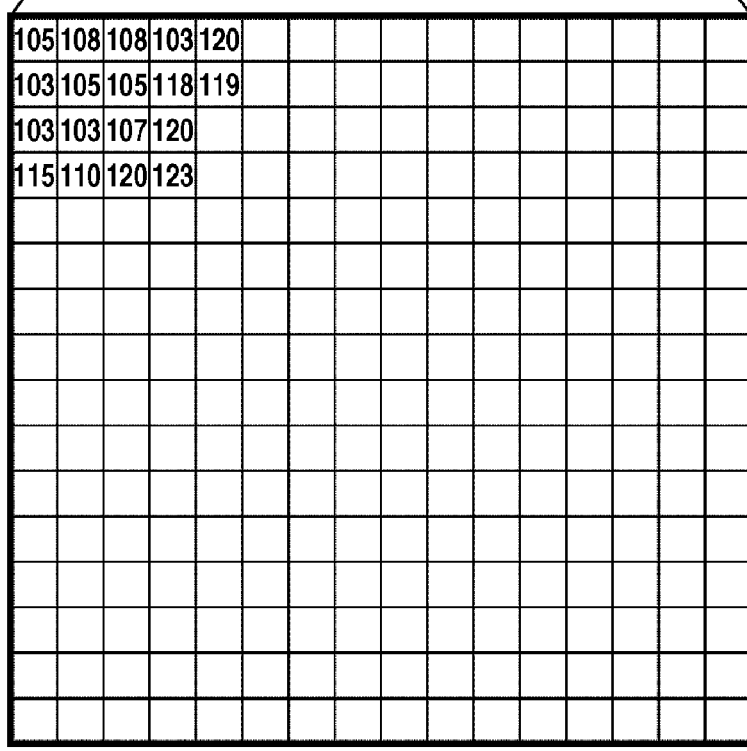

FIG. 12 illustrates an example of a relationship among the area 5, the divisional luminance data for the area 5, and the representative value for the divisional luminance data for the area 5.

The reference destination determination unit 1103 compares the luminance of each pixel with the representative value (an average luminance value for a 16×16 pixel area, for example) for the luminance data in the neighboring areas, based on the received divisional luminance data and the reference luminance data, to determine a reference destination address for each pixel.

In the second exemplary embodiment, the reference destination is determined in the following manner. First, the CPU searches for and extracts a unit having a representative value closest to the luminance value of each pixel, from among the neighboring areas existing in the vicinity of the unit area including each pixel. Then, the CPU uses the coordinates of the extracted unit area as the reference destination for each pixel.

Then, the reference destination determination unit 1103 outputs the reference destination address for each pixel to a color-difference value determination unit 1104.

The color-difference value determination unit 1104 uses the representative value (an average color-difference value for a 16×16 pixel area, for example) for the color-difference data of the coordinates indicated by the received reference destination address for each pixel, to determine a color-difference value of each pixel.

Then, the CPU replaces the color-difference data obtained in step 701 using the thus determined color-difference value of each pixel. That is, the CPU uses the aggregate of color-difference values of pixels obtained with the color-difference value determination unit 1104 as the restored color-difference data. Then, the CPU advances to step 706. The processing in step 706 and subsequent steps is similar to that in the first exemplary embodiment.

As described above, according to the present exemplary embodiment, the CPU compares the luminance value of each pixel and the representative value for the luminance data in the neighboring areas, and uses the unit area having a closest value in the neighboring areas as the reference destination for the representative value for use in restoring each pixel. The CPU colors each pixel using the representative value for the color-difference data of the reference destination determined based on the luminance data.

As described above, the present exemplary embodiment utilizes and takes advantage of the fact that a portion at which the luminance in a read image (monochromatic image) changes is generally a portion at which the color changes, which can be known experimentally or by experience.

However, a color and a luminance do not have a strong mutual relationship. Accordingly, it is necessary to be careful in utilizing the representative value for the color-difference data of the reference destination determined based on the luminance data, so as not to encounter a failure.

For example, a failure may occur at a portion at which the luminance does not change but the color changes, although this may not frequently occur in the case of printing a photograph image.

In the present exemplary embodiment, in order to reduce or suppress such a failure, the neighboring areas, which is a reference range for a representative value, is set narrow. Thus, the present exemplary embodiment can prevent or reduce a serious failure. Furthermore, alternatively or in addition to those described above, in the case where a plurality of areas whose representative value is a closest value exists, the CPU can select an area existing close to the center portion of an area in which the pixel is included, within the reference range, by priority.

Third Exemplary Embodiment

In the system for restoring color image data according to the second exemplary embodiment, the fact is utilized that a portion at which the luminance in a read image (monochromatic image) changes is generally a portion at which the color changes, which can be known experimentally or by experience. However, as described above in the second exemplary embodiment, a failure may occur with this method.

Figure 13:
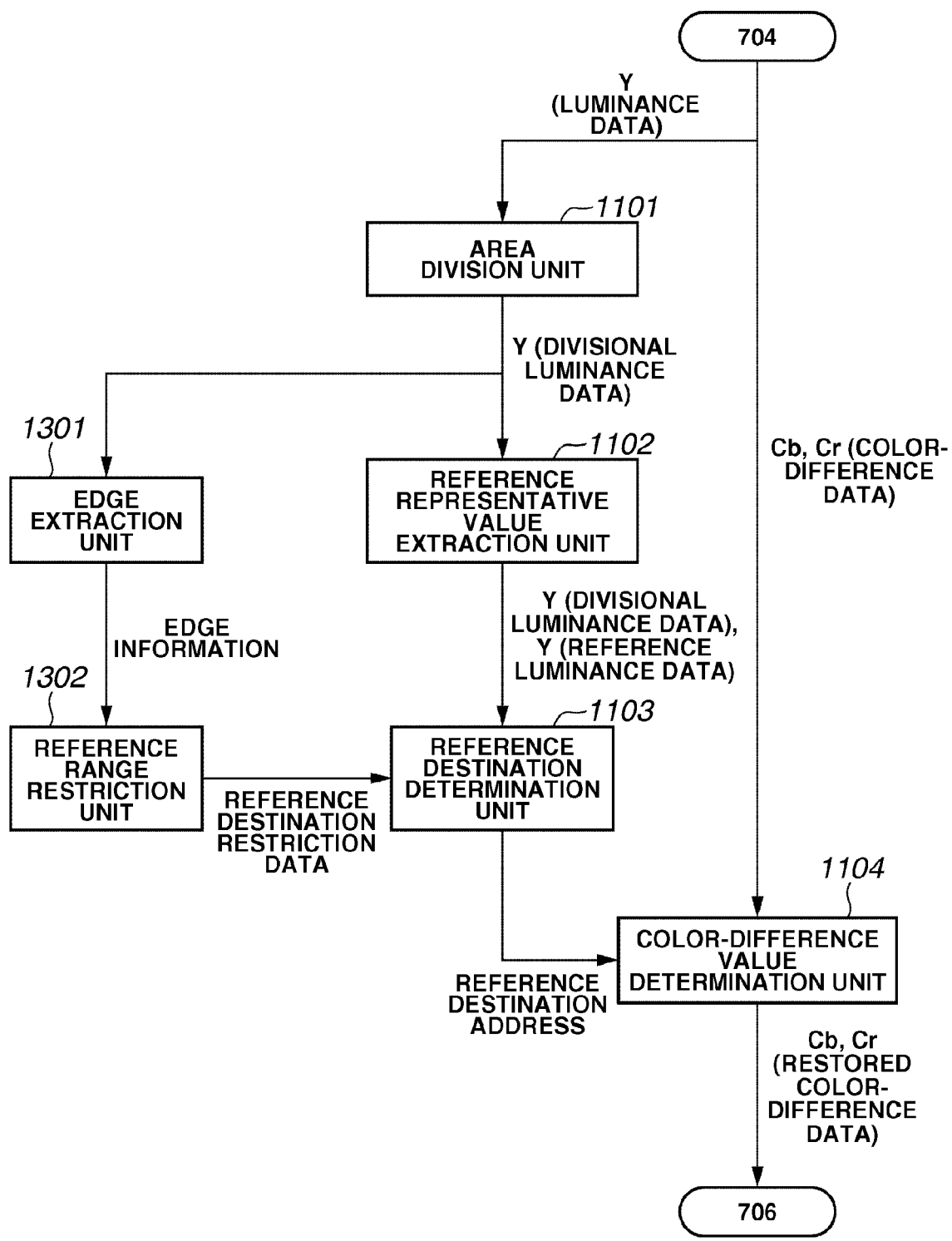
FIG. 13 is a flow chart illustrating an example of restoration processing utilizing edge information and neighboring areas according to an exemplary embodiment of the present invention.

In this regard, a third exemplary embodiment performs processing in FIG. 13 instead of the processing in FIG. 11, in order to reduce the probability of a failure and to increase the accuracy in restoring color image data. More specifically, in the example in FIG. 13, an edge extraction unit 1301 and a reference range restriction unit 1302 are provided, which are not included in the configuration in FIG. 11.

The edge extraction unit 1301 performs processing for extracting an edge and extracts edge information from the received divisional luminance data. Here, the divisional luminance data received from the area division unit 1101 is used. However, the luminance data received in step 704 can be used for the edge extraction processing.

There are a number of known edge extraction methods. The present exemplary embodiment performs edge enhancement processing with a filter, compares an obtained value with a predetermined threshold value, and generates an edge/non-edge 1-bit signal.

Figure 14:
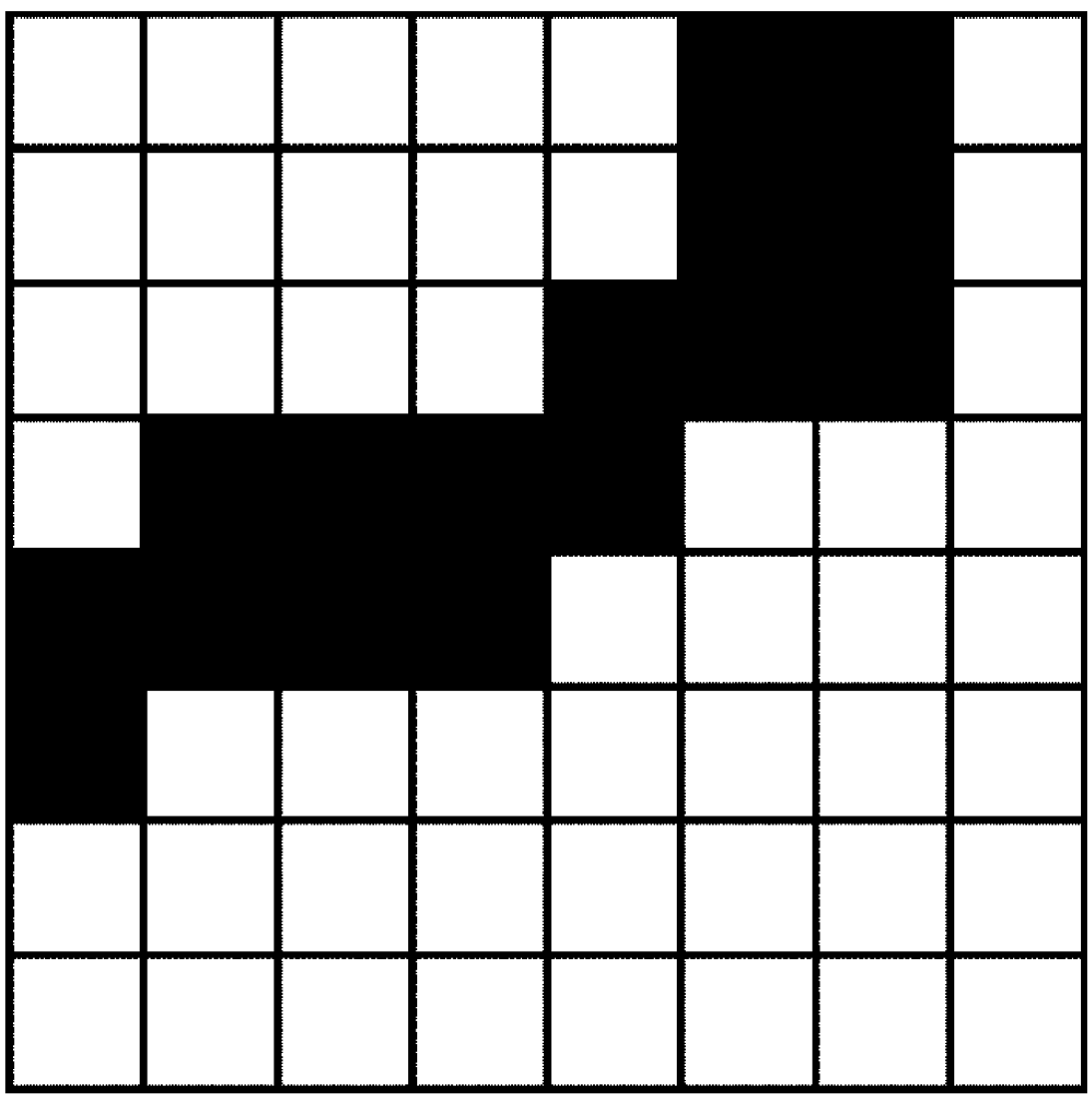
FIG. 14 illustrates an example of edge information according to an exemplary embodiment of the present invention.

As a result, information illustrated in FIG. 14 can be output. In the example in FIG. 14, pixels illustrated in black are pixels that have been determined as edges. The CPU outputs the edge information to the reference range restriction unit 1302.

The reference range restriction unit 1302 restricts the reference destination for the representative value to be used for restoring color image data based on the received edge information.

The restriction includes the following.

a. The representative value of an area located across an edge is not referred to with respect to non-edge pixels.

b. The representative value of an area that includes a pixel that has been determined as an edge is utilized. These restrictions are applied because it is not likely that the color of a pixel located across an edge is similar to the original color of a specific focused pixel.

Figure 15:
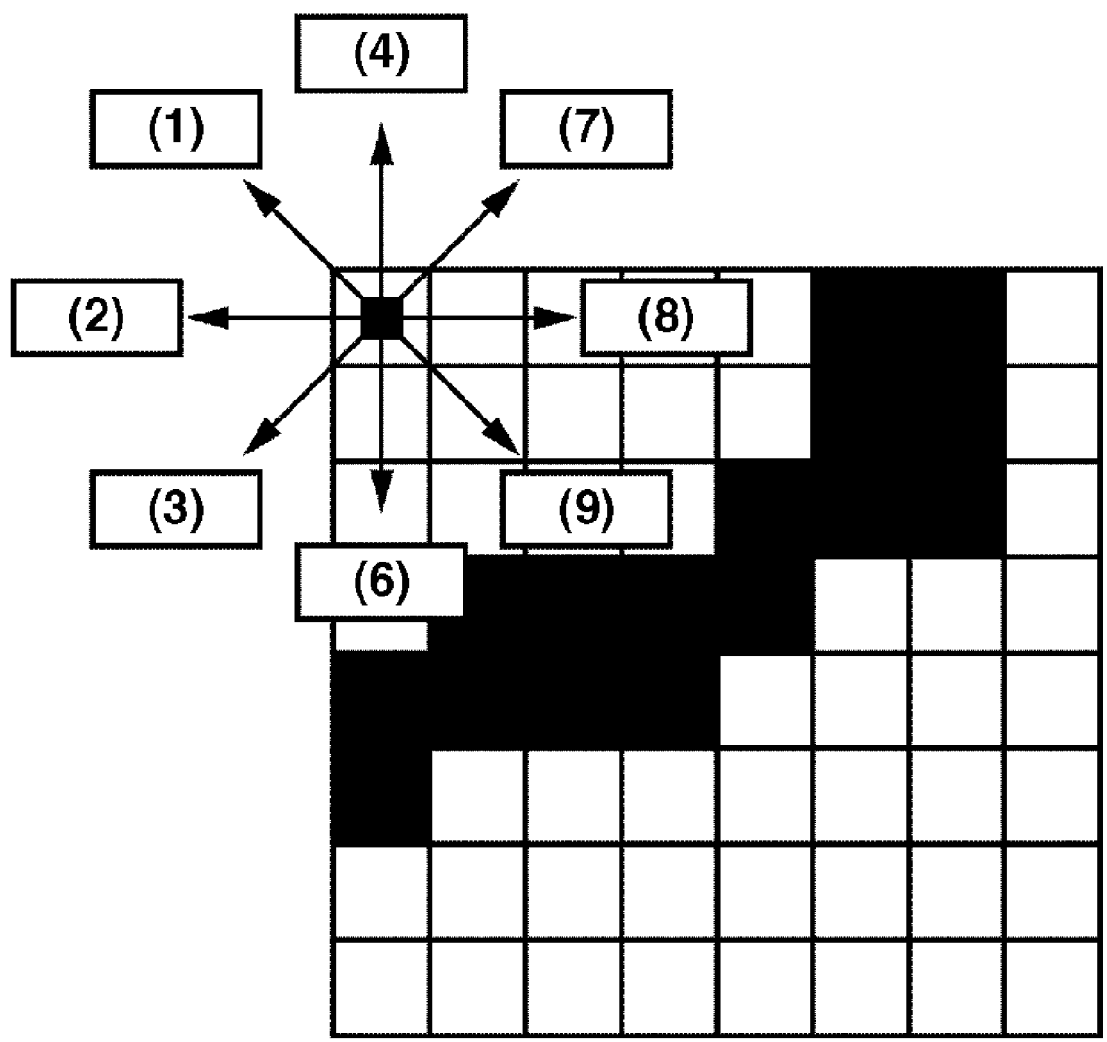
FIG. 15 illustrates an example of reference destination restriction processing performed based on edge information according to an exemplary embodiment of the present invention.

A case of an upper-left pixel (FIG. 15) will be described. In this case, there are nine reference directions (1) to (9). However, the directions (6), (8), and (9) intersect with the edge data. Thus, the CPU does not refer to the representative values for the areas located beyond the edge in the directions (6), (8), and (9).

As described above, the CPU restricts the reference destination for each pixel and outputs the information about the restriction to the reference destination determination unit 1103 as the reference destination restriction data. The reference destination determination unit 1103, on the premise of the restriction on the reference destination, determines the reference destination as described in the second exemplary embodiment.

Other Exemplary Embodiments

As described above, in an image processing apparatus illustrated in any of FIGS. 1 through 4, the density generation unit 106 uses only luminance data of the color image data to generate density data. However, the present invention is not limited to this. That is, the density generation unit 106 can generate density data using both luminance data and color-difference data of the color image data.

Alternatively, the density generation unit 106 can generate density data using RGB channel data of the color image data.

In actual cases, a black toner can generally include a little information about color-difference. In this regard, it is useful to generate density data using the color-difference data in order to cancel the color-difference information.

Moreover, the present invention can be applied to a system including a plurality of devices (for example, a computer, an interface device, a reader, and a printer) and to an apparatus that includes one device (for example, a multifunction peripheral, a printer, or a facsimile machine).

Furthermore, the present invention can also be achieved by providing a system or a device with a storage medium (or a recording medium) that stores software program code implementing the functions of the above-described embodiments and by reading and executing the program code stored in the storage medium with a computer of the system or the device (a CPU or a micro processing unit (MPU)).

In this case, the program code itself, which is read from the storage medium, implements the functions of the embodiments mentioned above, and accordingly, the storage medium storing the program code constitutes the present invention. In addition, the functions according to the embodiments described above can be implemented not only by executing the program code read by the computer, but also implemented by the processing in which an operating system (OS) or the like carries out a part of or the whole of the actual processing based on an instruction given by the program code.

As the storage medium for supplying such program code, a floppy disk, a hard disk, an optical disk, a magneto-optical disk (MO), a CD-ROM, a CD-recordable (CD-R), a CD-rewritable (CD-RW), a magnetic tape, a nonvolatile memory card, a ROM, and a digital versatile disc (DVD (a DVD-recordable (DVD-R) or a DVD-rewritable (DVD-RW)), for example, can be used.

In addition, the functions according to the embodiments described above can be implemented not only by executing the program code read by the computer, but also implemented by the processing in which an OS or the like carries out a part of or the whole of the actual processing based on an instruction given by the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2006-328205 filed Dec. 5, 2006 and No. 2007-114330 filed Apr. 24, 2007, which are hereby incorporated by reference herein in their entirety.

What is claimed is:

1. An apparatus for processing luminance data and color-difference data of color image data, the apparatus comprising:
   a processing unit configured to perform first data amount reduction processing on the luminance data to output reduced luminance data, and configured to output the color-difference data without reducing a data amount thereof at a reduction ratio equal to or higher than a reduction ratio in the first data amount reduction processing;
   a generation unit configured to generate digital watermark image data by encoding the reduced luminance data and the color-difference data output from the processing unit; and
   a production unit configured to produce a print product based on the luminance data before being subjected to the first data amount reduction processing and the digital watermark image data generated by the generation unit,
   wherein the luminance data and the digital watermark image data are output as luminance component data and no data as color-difference component data, and
   wherein the print product produced by the production unit based on the digital watermark image data and the luminance data as output luminance component data is configured to be used to generate color image data.

2. The apparatus according to claim 1, wherein the digital watermark image data correspond to at least one of monochromatic watermark image, two-dimensional bar code image, one-dimensional bar code image and monochromatic steganography image.

3. The apparatus according to claim 1, wherein the processing unit performs second data amount reduction processing for reducing a data amount of the color-difference data at a reduction ratio lower than the reduction ration in the first data amount reduction processing to output the color-difference data,
   wherein reduced luminance data in the digital watermark image data obtained from the print product produced by the production unit is configured to be used to correct luminance data obtained from the print product produced by the production unit, and
   wherein the corrected luminance data and color-difference data in the digital watermark image data obtained from the print product produced by the production unit are configured to be used to generate color image data.

4. The apparatus according to claim 3, wherein the processing unit generates a characteristic amount of the entire luminance data based on the luminance data and outputs the generated characteristic amount as the reduced luminance data.

5. The apparatus according to claim 1, wherein the apparatus is an image forming apparatus for performing at least one of a printing function and a scanning function.

6. A method for an apparatus for processing luminance data and color-difference data of color image data, the method comprising:
   performing first data amount reduction processing on the luminance data to output reduced luminance data, and outputting the color-difference data without reducing a data amount thereof at a reduction ratio equal to or higher than a reduction ratio in the first data amount reduction processing;
   generating digital watermark image data by encoding the output reduced luminance data and the output color-difference data; and
   producing a print product based on the luminance data before being subjected to the first data amount reduction processing and the generated digital watermark image data,
   wherein the luminance data and the digital watermark image data are output as luminance component data and no data as color-difference component data, and
   wherein the print product produced based on the digital watermark image data and the luminance data as output luminance component data is used to generate color image data.

* * * * *